(12) United States Patent
Linassier et al.

(10) Patent No.: US 10,683,805 B2
(45) Date of Patent: Jun. 16, 2020

(54) ANTI-ICING SYSTEM FOR A TURBINE ENGINE VANE

(71) Applicant: SAFRAN AIRCRAFT ENGINES, Paris (FR)

(72) Inventors: Guillaume Claude Georges Philippe Linassier, Moissy-Cramayel (FR); Morgan Balland, Moissy-Cramayel (FR); Helene Mazet, Moissy-Cramayel (FR); Christophe Scholtes, Moissy-Cramayel (FR); Antoine Robert Alain Brunet, Moissy-Cramayel (FR); Simon Amodeo, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 154 days.

(21) Appl. No.: 15/748,252

(22) PCT Filed: Jul. 27, 2016

(86) PCT No.: PCT/FR2016/051953
§ 371 (c)(1),
(2) Date: Jan. 29, 2018

(87) PCT Pub. No.: WO2017/017378
PCT Pub. Date: Feb. 2, 2017

(65) Prior Publication Data
US 2018/0216528 A1  Aug. 2, 2018

(30) Foreign Application Priority Data

Jul. 30, 2015  (FR) ...................................... 15 57285
Jan. 22, 2016  (FR) ...................................... 16 50510

(51) Int. Cl.
*F02C 7/047* (2006.01)
*F01D 25/02* (2006.01)
*F01D 9/04* (2006.01)

(52) U.S. Cl.
CPC .............. *F02C 7/047* (2013.01); *F01D 9/041* (2013.01); *F01D 25/02* (2013.01); *F05D 2240/14* (2013.01)

(58) Field of Classification Search
CPC .......... F01D 25/02; F01D 25/14; F01D 9/041; F02C 7/047

(Continued)

(56) References Cited

U.S. PATENT DOCUMENTS 2,469,375 A * 5/1949 Flagle ..................... F02C 7/047
415/47
4,187,054 A * 2/1980 Landis, Jr. ................ F01D 5/18
415/115

(Continued)

FOREIGN PATENT DOCUMENTS

EP   1 988 259 A2   11/2008
GB       867849      5/1961

(Continued)

OTHER PUBLICATIONS

NASA TN D-6966: Correlation for Temperature Profiles in the Plane of Symmetry Downstream of a Jet Injected Normal to a Crossflow, 1972 (Year: 1972).*

(Continued)

*Primary Examiner* — Michael Lebentritt
*Assistant Examiner* — Topaz L. Elliott
(74) *Attorney, Agent, or Firm* — Oblon, McClelland, Maier & Neustadt, L.L.P.

(57) ABSTRACT

An anti-icing system for a turbine engine vane extending between an outer casing and an inner casing defining a (Continued)

passage, the system includes an injector device for injecting a jet of air into the passage upstream from the vane, the injector device including a first injection orifice for injecting the jet of air, the first orifice passing through one member selected from the outer casing and the inner casing, and being located in such a manner that, at a first speed of the engine wherein a stream of air flows generally in the passage along a first direction, the first orifice and a leading edge of the vane are substantially in alignment along the first direction, the first orifice is spaced apart from the junction between the leading edge of the vane and the member through which the first orifice passes by a distance of at least 10 mm, and preferably of about 15 mm.

9 Claims, 4 Drawing Sheets

(58) Field of Classification Search
USPC .......................................................... 415/117
See application file for complete search history.

(56) References Cited

U.S. PATENT DOCUMENTS

| | | | | |
|---|---|---|---|---|
| 4,419,045 A * | 12/1983 | Andre | ...................... | F02C 7/045 415/119 |
| 5,417,545 A * | 5/1995 | Harrogate | ............... | F01D 5/186 415/115 |
| 6,561,760 B2 * | 5/2003 | Wadia | ...................... | F01D 25/02 415/145 |
| 6,758,651 B2 * | 7/2004 | Tomita | ...................... | F01D 5/18 415/115 |
| 7,811,050 B2 * | 10/2010 | Roth | ...................... | F01D 17/162 415/116 |
| 8,011,172 B2 * | 9/2011 | Lockwood | .............. | F02C 7/047 137/15.1 |
| 8,206,079 B2 * | 6/2012 | Bagnall | ................... | F01D 5/143 415/108 |
| 8,459,935 B1 * | 6/2013 | Liang | ...................... | F01D 5/187 415/115 |
| 8,491,254 B2 * | 7/2013 | Domercq | .............. | F01D 17/162 415/115 |
| 9,599,020 B2 * | 3/2017 | Sandelis | .................. | F01D 5/186 |
| 9,657,640 B2 * | 5/2017 | Herbaut | .................. | F01D 25/02 |
| 9,777,632 B2 * | 10/2017 | Prather | .................... | F01D 25/02 |
| 9,915,169 B2 * | 3/2018 | Tibbott | .................... | F01D 9/047 |
| 10,017,259 B2 * | 7/2018 | Bouillon | ................. | F01D 25/02 |
| 10,060,351 B2 * | 8/2018 | Oggero | .................... | F01D 25/02 |
| 10,138,755 B2 * | 11/2018 | Gomanne | ............... | F01D 25/02 |
| 10,415,473 B2 * | 9/2019 | De Vriendt | ............... | F02K 3/02 |
| 2003/0035719 A1 | 2/2003 | Wadia et al. | | |
| 2008/0273972 A1 | 11/2008 | Bagnall et al. | | |
| 2011/0058931 A1 | 3/2011 | Domercq et al. | | |
| 2014/0116065 A1 * | 5/2014 | Sandelis | .................. | F01D 5/186 60/805 |
| 2015/0007895 A1 * | 1/2015 | Herbaut | .................. | F01D 25/02 137/15.1 |
| 2016/0032764 A1 * | 2/2016 | Tibbott | .................... | F01D 9/047 415/116 |
| 2016/0097323 A1 | 4/2016 | Prather et al. | | |
| 2017/0321604 A1 * | 11/2017 | Lourit | ...................... | F02C 7/047 |
| 2018/0112596 A1 * | 4/2018 | Vriendt | .................... | F02C 7/047 |
| 2019/0024533 A1 * | 1/2019 | Scholtes | ................. | F01D 25/02 |

FOREIGN PATENT DOCUMENTS

| | | |
|---|---|---|
| GB | 2442967 B | 4/2008 |
| WO | 2009/156600 A1 | 12/2009 |
| WO | 2014/182289 A1 | 11/2014 |

OTHER PUBLICATIONS

NASA TM 106865: Crossflow Mixing of Noncircular Jets. https://ntrs.nasa.gov/archive/nasa/casi.ntrs.nasa.gov/19950017970.pdf (Year: 1995).*

International Search Report dated Oct. 14, 2016 in PCT/FR2016/051953 filed Jul. 27, 2016.

* cited by examiner

ANTI-ICING SYSTEM FOR A TURBINE ENGINE VANE

TECHNICAL FIELD OF THE INVENTION

The present invention relates to the general field of turbine engines. It relates more particularly to an anti-icing system for a turbine engine vane, in particular a compressor vane situated across a primary flow passage of the turbine engine.

TECHNOLOGICAL BACKGROUND OF THE INVENTION

A turbine engine conventionally includes a fan delivering a stream of air, having a central portion referred to the primary or "core" stream that is injected into a primary flow passage including a compressor, a combustion chamber, and a turbine driving the fan.

During certain stages of flight (climbing, descending, . . . ), so-called "icing" atmospheric conditions can be encountered when the ambient temperature becomes less than or equal to zero degrees Celsius. Such conditions can lead to ice becoming deposited on the vanes of the compressor. The phenomenon can give rise to problems with the operability of the turbine engine, e.g. by obstructing the primary passage, or indeed with flame out of the combustion chamber as a result of blocks of ice becoming detached.

Conventional solutions for de-icing a vane by a flow of hot air or by having electrical components within said vane are difficult to apply to compressor vanes, since they are of dimensions that are too small, having a thickness of the order of a few millimeters.

GENERAL DESCRIPTION OF THE INVENTION

The invention provides an anti-icing system for a turbine engine compressor vane, but that it is capable of being applied more generally to any turbine engine vane that extends across a flow passage, between an inner casing and an outer casing.

The invention thus essentially relates to an anti-icing system for a turbine engine vane extending between an outer casing and an inner casing defining a passage. The anti-icing system comprises injector means for injecting a jet of air into the passage upstream from the vane, the injector means including a first injection orifice for injecting the jet, the first orifice passing through one member selected from the outer casing and the inner casing, and being located in such a manner that, at a first speed of the engine in which a stream of air flows generally in the passage along a first direction, the first orifice and a leading edge of the vane are substantially in alignment along the first direction.

According to a general characteristic of the invention, the first orifice is spaced apart from the junction between said leading edge of the vane and the member through which the first orifice passes by a distance of at least 10 millimeters (mm), and preferably of about 15 mm.

The proposed solution consists in heating the wall of the vane that is exposed to ice formation by means of the impact of a jet of hot air. The injector means serve to inject the jet of hot air into the passage, upstream from the vane, via the first injection orifice. The term "upstream" should be understood relative to the travel direction of the air stream flowing in the passage, said air stream going from upstream to downstream. The jet of air is then sheared and entrained by the air stream flowing in the passage. Thereafter, as a result of the location of the first orifice, the jet of air entrained by the air stream impacts against the vane at its leading edge. By advantageously defining parameters specific to the first injection orifice (its shape, its dimensions, its angle of inclination, etc.) and to the jet of air (its temperature, its speed, etc.), it is possible to de-ice the vane appropriately and/or to prevent ice forming on the vane.

By having the first orifice at least 10 mm away and preferably about 15 mm away from the leading edge, it is ensured firstly that it is outside the stagnation zone of the vane, and secondly that it is far enough away from the leading edge of the vane for the shear of the jet of hot air by the stream of primary air flowing in the primary passage to enable a hot air profile to be formed that is deflected towards the leading edge of the vane and that extends over a height of the vane that is sufficiently large to optimize the area of de-icing. The orifice of the system is thus positioned far enough upstream from the vane to leave enough space to enable the hot jet to penetrate deeply into the primary passage and thus form a hot air profile that extends over a height of the passage that is large enough to de-ice vanes over a satisfactory height.

The stagnation zone of the vane corresponds to a region immediately upstream from the leading edge of the vane in which movements of gas are very small. The stagnation zone generally extends upstream from the vane over 2 mm to 3 mm from the leading edge of the vane.

In general manner, the system of the invention makes it possible, when taking hot air from the engine at a given rate, to obtain better penetration of the jet of hot air into the passage than is obtained with prior art devices. Specifically, studies have shown in particular that there is an increase in the penetration of the jets into the passage by up to 50% more than with prior art devices based on jets of hot air.

The system provides a second benefit in that it makes it possible to deflect the path followed by super-cooled drops of water present in the air stream in icing conditions. These drops of water have fairly low inertia and tend to adapt rapidly to changes in the paths of the stream of air. Thus, as a result of the topology of the sheared jet of air, the trajectories of certain drops deflected by the jet do not encounter the surface of the vane, thereby minimizing the quantity of ice that is formed.

Another benefit of the invention is that the drops flowing within the jet of hot air are also heated. This effect combines with heating the wall of the vane, thereby minimizing the energy needed to avoid drops of water freezing on the surface.

The anti-icing system of the invention is adapted to vanes of small thickness, where implementing a conventional system (internal heating by hot air or by a resistive system) is difficult to undertake.

Furthermore, the system does not require elements to be added in the passage in order to bring the air jet to a point upstream from the vane. Adding any such component would have an impact on the aerodynamic behavior of the passage.

In addition to the characteristics mentioned in the above paragraph, the anti-icing system of the invention may present one or more of the following additional characteristics that may be considered individually or in any technically feasible combination.

In a non-limiting embodiment, the vane presents a sloping leading edge and the first orifice is positioned in register with a point of the leading edge situated at a height of about 40% of said passage. The vane slopes in a direction such that the junction between the vane and the inner casing is positioned further upstream than is the junction between the vane and the outer casing of the ring.

In a non-limiting embodiment, the first orifice extends substantially radially relative to a longitudinal axis along which the turbine engine extends.

In other words, the first orifice passes through the member (i.e. the outer casing or the inner casing) substantially radially. The jet of air is then injected into the passage substantially orthogonally to the stream of air, which in turn flows substantially along the longitudinal axis of the engine. This angle of 90° maximizes penetration of the jet of air into the passage. Thus, it is possible to apply anti-icing to a maximum height of the vane. The term "height of the vane" is used to designate the radial dimension of the vane (between the inner casing and the outer casing).

The shape of the first orifice is advantageously selected as a function of aerodynamic conditions. In order to enhance penetration of the jet of air into the passage, an orifice of oval shape in alignment with the flow direction of the air stream is used. In contrast, an orifice that is cylindrical or oval in the direction that is transverse to the flow direction could be used in order to obtain a greater width for the jet.

In a non-limiting embodiment in which the first orifice is circular in shape and passes through the member substantially radially, the ratio between the radial penetration distance Zd of the jet of air into the passage and the diameter D of the first orifice is governed by the following equations:

$$\frac{Zd}{D} = 0.76 \frac{\rho^{0.71}}{\rho_\infty} J^{0.52} \frac{Xd^{0.27}}{D}$$

$$J = \frac{\rho V^2}{\rho_\infty V_\infty^2}$$

where:
J is the blow-up ratio of the jet of air;
Xd is the distance from the first orifice to the vane;
$\rho$ is the density of the air in the jet at the first orifice;
$\rho_\infty$ is the density of the air in the passage upstream from the vane;
V is the velocity of the air in the jet at the first orifice; and
$V_\infty$ is the velocity of the air in the passage upstream from the vane.

In a non-limiting embodiment, the injector means include a second injection orifice for injecting the jet, the second orifice passing through the member and being located in such a manner that at a second speed of the engine, different from the first speed, in which the stream of air flows generally in the passage along a second direction, different from the first direction, the second orifice and the leading edge of the vane are substantially in alignment along the second direction.

Specifically the angle of incidence of the air stream flowing in the passage depends on the speed of the engine. For optimized de-icing, it is important for the injection orifice and the leading edge to be in the direction of the air stream so that the jet of air impacts the vane at its leading edge. Injecting the jet of air via the first orifice or else via the second orifice, depending on the direction of the air stream flowing in the passage (i.e. depending on the speed of the engine), thus makes it possible to optimize de-icing.

Naturally, the injector means may include other jet injection orifices passing through the member and located in such a manner that at other speeds of the engine, different from the first and second speeds, each orifice and the leading edge are substantially in alignment along a direction of the air stream flowing in the passage, that is different from the first direction and from the second direction.

In a non-limiting embodiment, the anti-icing system includes shutter means for shutting the first orifice or the second orifice and controlled as a function of the speed of the engine.

Advantageously, only the orifice that is in alignment with the leading edge of the vane in the direction of the air stream flowing in the passage is open.

In a non-limiting embodiment, the injector means include a slot passing through the member and shutter means for partially shutting the slot, the first orifice being constituted by the portion of the slot that is not shut.

In a non-limiting embodiment, the shutter means are movable along the slot so as to move the first orifice, the shutter means being controlled as a function of the speed of the engine.

The movement of the shutter means relative to the slot serves to adjust the position of the first orifice. This enables it to be positioned in such a manner as to be in alignment with the leading edge of the vane in the direction of the air stream flowing in the passage.

In a non-limiting embodiment, the shutter means are coupled to means for varying the pitch of the vane. The means for varying the pitch of the vane are means for modifying the position of the vane in the passage, in particular modifying the location of the leading edge of said vane. This makes it possible to ensure that the orifice through which the jet of air is injected is always in alignment with the leading edge of the vane in the direction of the air stream flowing in the passage, even when the position of the leading edge is modified.

In a non-limiting embodiment, the injector means include a third injection orifice passing through the member, and positioned substantially between the first orifice and the leading edge.

It is thus possible to inject the jet of air into the passage both through the first orifice and through the third orifice. This makes it possible to de-ice or to prevent ice forming over a greater height of the vane. Naturally, the injector means may include other orifices for injecting the jet, that are different from the first and third orifices, and that are positioned substantially between the first orifice and the leading edge.

In a non-limiting embodiment, the anti-icing system includes means for taking the jet of air from a high-pressure compressor of the engine. The air is then conveyed to the injector means by means of a system of collector manifolds, valves, pipework, and distributor manifolds.

In a non-limiting embodiment, each vane has an inner platform and an outer platform between which the vane extends, the inner platforms of the vanes in a given ring forming an inner shroud, the outer platforms of the vanes in a given ring forming an outer shroud, the outer casing including said outer shroud of the vane, the outer platform of each vane including at least the first orifice for de-icing the vane.

In another non-limiting embodiment, the outer casing includes a stream splitter nose for positioning downstream from a fan of the engine in order to separate a primary stream and a secondary stream coming from the fan between annular channels, said nose being positioned upstream from the vane and having an outer annular wall defining the inside of the flow channel for the secondary stream and an inner annular wall defining an inlet to the flow channel for the primary stream, said inner wall including at least said first orifice.

The invention also provides a turbine engine including an anti-icing system as described above.

The invention can be better understood in the light of the following description given with reference to the figures listed below.

GENERAL DESCRIPTION OF THE INVENTION

Unless specified to the contrary, when the same element appears in more than one of the figures, it is given the same reference.

Figure 1:
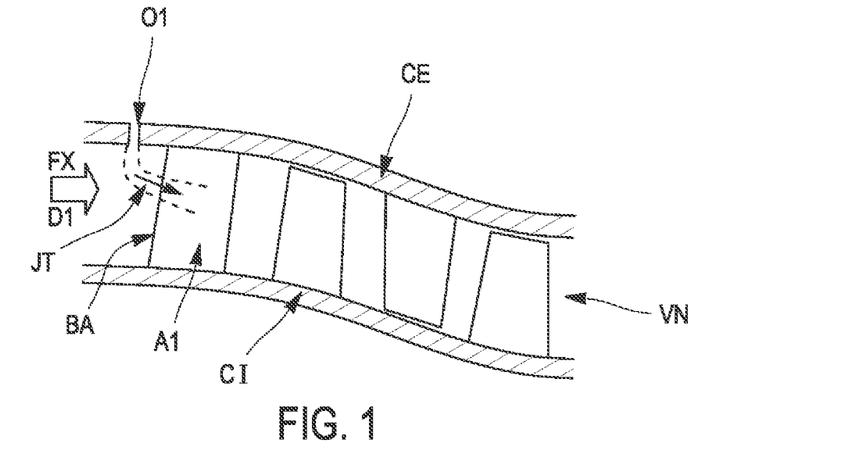
FIG. 1 shows a turbine engine flow passage in longitudinal section having arranged across it a succession of sets of vanes, and an anti-icing system of the invention with a first orifice.

FIG. 1 shows a turbine engine flow passage VN defined firstly by an outer casing CE and secondly by an inner casing CI. This example is a primary flow passage of a bypass turbine engine, which engine extends along a longitudinal axis X. Nevertheless, the invention could be applied to any type of turbine engine, including a single-flow machine or a helicopter engine. When the turbine engine is in operation at a first speed, a stream of air FX flows substantially along a first direction D1 within the flow passage VN. It should be observed that the direction of the stream of air FX depends directly on the operating speed of the engine.

A series of sets of vanes extend across the flow passage VN. In this example, these are vanes of a compressor in a bypass engine that are installed downstream from a fan of the engine in the primary or "core" flow passage. The set of vanes situated furthest upstream in the flow passage VN relative to the flow direction of the air stream FX is made up of a plurality of vanes, with one of them A1 being visible in FIG. 1. This vane A1 is fastened firstly to the inner casing CI and secondly to the outer casing CE.

The engine includes an anti-icing system for de-icing the vane A1 or for preventing ice from forming thereon. The anti-icing system comprises:

means for taking a jet of air JT from a high-pressure compressor of the engine. The compressor and the means for taking the jet are not shown in the figures. Hottest and highest-pressure jets of air JT are preferred in order to optimize de-icing over a maximum height of the vane A1;

conveying means for conveying the jet of air JT to a point upstream from the first vane A1, close to the flow passage VN. These conveying means comprise collector manifolds, valves, pipework, and distributor manifolds, and they are not shown in the figures; and injector means for injecting the jet of hot air JT into the flow passage VN upstream from the vane A1. The jet of hot air JT is then directed by the stream of air FX towards the vane A1, and then impacts against the leading edge BA of the vane A1, thereby increasing the temperature of said leading edge BA. This makes it possible to avoid ice forming on the leading edge BA and/or to de-ice the leading edge BA.

Figure 2:
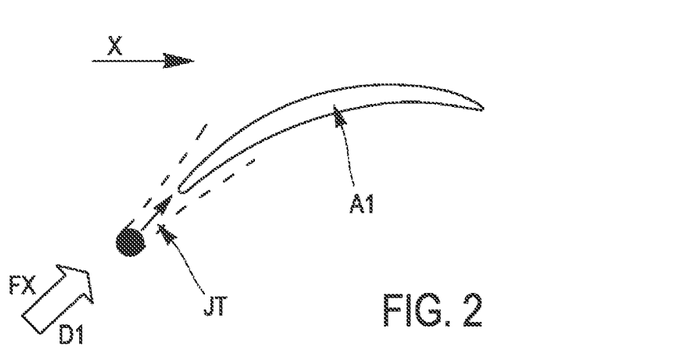
FIG. 2 shows a vane seen from above, and a first injection orifice of an anti-icing system of the invention.

FIG. 2 shows a first embodiment of the injector means. In this embodiment, the injector means comprise a first orifice O1 for injecting the jet JT, the first orifice O1 passing through the outer casing CE. In another embodiment, the first orifice O1 could pass through the inner casing. The first orifice O1 is located so that at the first speed of the engine in which the stream of air FX flows generally along the passage VN in the first direction D1, the first orifice O1 and the leading edge D1 of the vane A1 are substantially in alignment along the first direction D1. In other words, a straight line connecting the first orifice O1 to the leading edge BA coincides substantially with the first direction D1.

Figure 3:
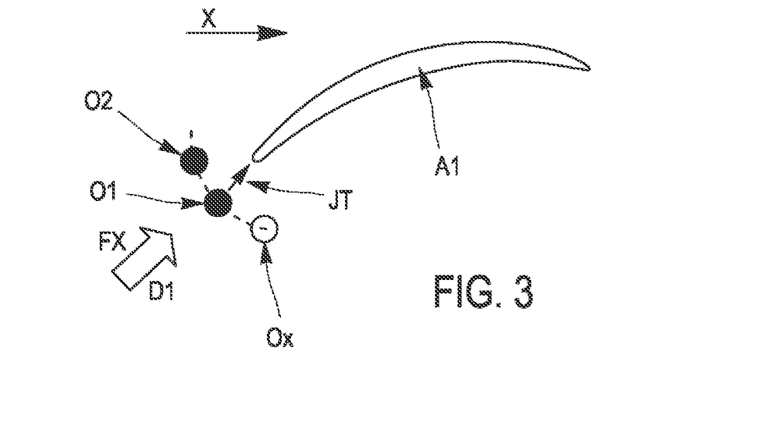
FIG. 3 shows a vane seen from above, with one first orifice and two second orifices of an anti-icing system of the invention in a first position.
Figure 4:
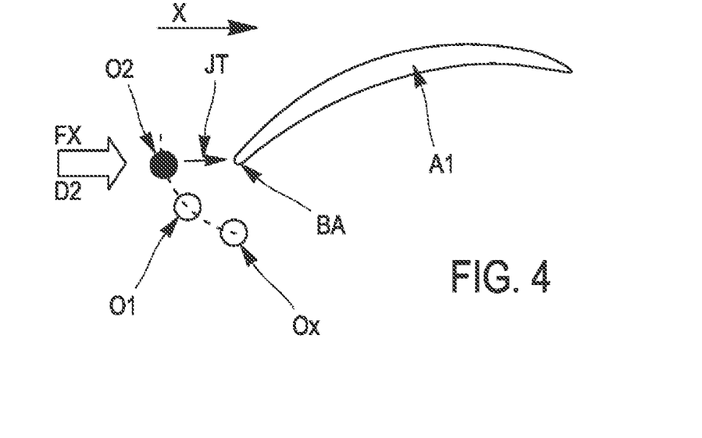
FIG. 4 shows a vane seen from above, with one first orifice and two second orifices of an anti-icing system of the invention, in a second position.

FIGS. 3 and 4 show a second embodiment of the injector means, serving to cover a range of angles of incidence of the stream of air FX. In this embodiment, the injector means comprise, in addition to the above-described first orifice O1, a second orifice O2 passing through the outer casing CE. The second orifice O2 is located in such a manner that at a second speed of the engine, different from the first speed, in which the stream of air FX flows generally in the flow passage VN along a second direction D1 that is different from the first direction D1, the second orifice O2 and the leading edge BA of the vane A1 are substantially in alignment along the second direction D2. In other words, a straight line connecting the second orifice O2 to the leading edge BA coincides substantially with the second direction D2, as can be seen in FIG. 4.

In the embodiment shown in FIGS. 3 and 4, the injector means comprise not only the first orifice O1 and the second orifice O2, but also another orifice Ox. The other orifice Ox is located in such a manner that at another speed of the engine, different from the first speed and from the second speed, and in which the flow of air FX flows generally in the passage VN along another direction, different from the first direction D1 and the second direction D2, the other orifice Ox and the leading edge BA of the vane A1 are substantially in alignment along the other direction. In other words, a straight line connecting the other orifice Ox to the leading edge BA coincides substantially with the other direction (not shown in the figures).

In addition, the injector means include shutter means for shutting the first orifice O1, the second orifice O2, or the other orifice Ox, which shutter means are controlled as a function of the speed of the engine. When the engine is at the first speed, i.e. when the stream of air FX flowing in the passage flows the first direction D1, as shown in FIG. 3, then only the first orifice O1 is open: the second orifice O2 and the other orifice Ox are shut by the shutter means. When the engine is at the second speed, i.e. when the stream of air FX flowing in the passage follows the second direction D2, as shown in FIG. 4, then only the second orifice O2 is open: the first orifice O1 and the other orifice Ox are shut by the shutter means. Finally, when the engine is at the other speed, i.e. when the flow of air FX flowing in the passage follows the other direction, then only the other orifice Ox is open: the first orifice O1 and the second orifice O2 are shut by the shutter means.

Thus, only the orifice that is on the axis of the flow direction of the stream FX and that faces the leading edge BA of the vane A1 is open, and the jet of air JT is injected into the passage VN through that orifice. The jet of air JT, as sheared and entrained by the stream of air FX, then impacts against the leading edge BA of the vane A1.

Figure 5:
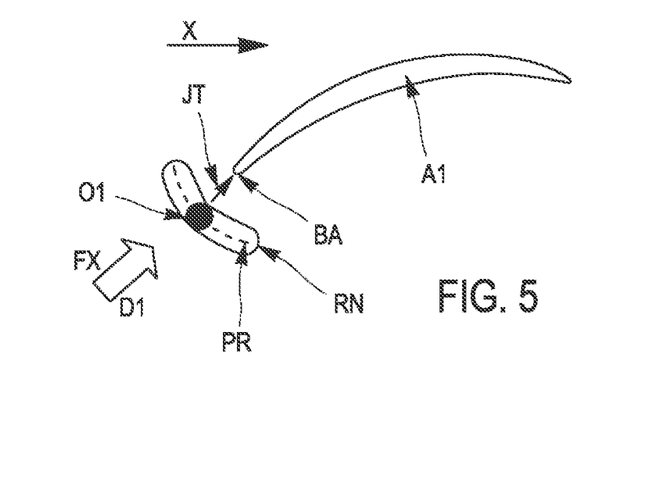
FIG. 5 shows a vane seen from above, together with a slot of an anti-icing system of the invention, in a first position.
Figure 6:
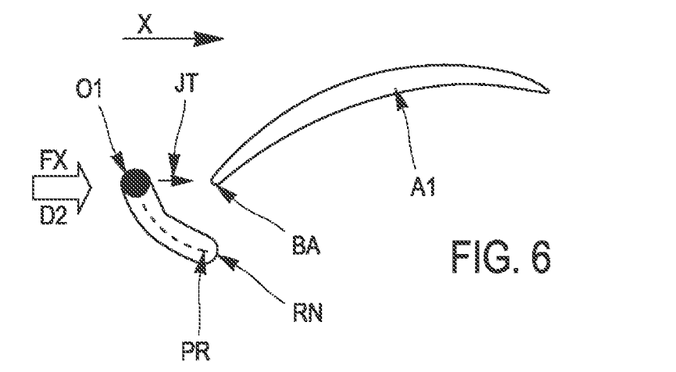
FIG. 6 shows a vane seen from above together with a slot of an anti-icing system of the invention, in a second position.

FIGS. 5 and 6 show a third embodiment of the injector means, which is a variant of the above-described second embodiment. In this embodiment, the injector means comprise a slot RN passing through the outer casing CE, together with shutter means for partially shutting the slot RN, the first orifice O1 being constituted by the portion of the slot RN that is not shut. The jet of air JT is injected into the passage VN via the first orifice O1. In addition, the shutter means are movable along the slot RN, as shown in FIGS. 5 and 6, so as to move the first orifice O1 along the slot RN. The shutter means may for example comprise a wall PR having a hole of the size of the first orifice O1 that is movable along the slot RN. Moving the wall PR relative to the slot RN makes it possible to adjust the angular position of the first injection orifice O1 so that it faces the leading edge BA of the vane A1 in the flow direction of the air stream FX flowing in the passage VN. The shutter means are thus controlled as a function of the speed of the engine.

Furthermore, certain engines include means for varying the pitch of the vanes. In engines of this type, the position of the leading edge BA of the vane A1 can change. It is thus advantageous to couple the shutter means with the means for varying the pitch of the vane, so as to take this variable into account.

Figure 7:
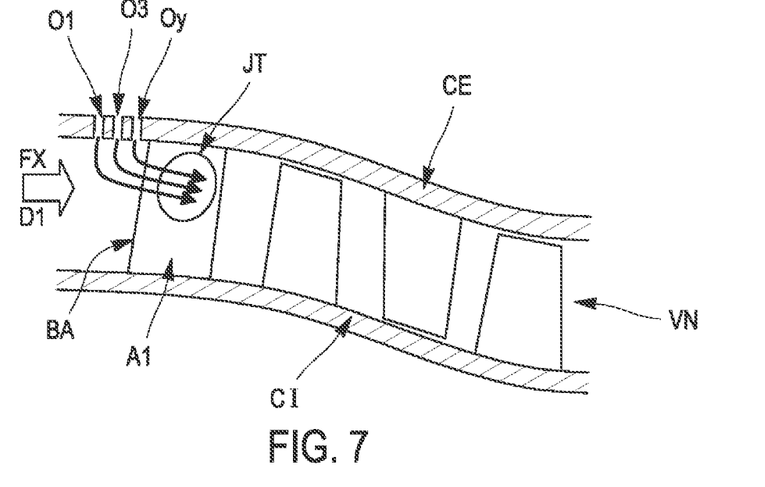
FIG. 7 shows a turbine engine flow passage in longitudinal section having a succession of sets of vanes placed across it, together with an anti-icing system of the invention having one first orifice and two second orifices.
Figure 8:
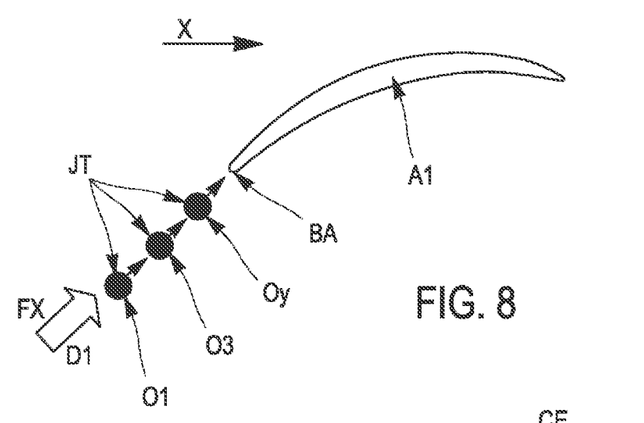
FIG. 8 shows a vane seen from above, together with one first orifice and two third orifices in an anti-icing system of the invention.

FIGS. 7 and 8 show a fourth embodiment of the injector means. In this embodiment, in addition to the above-described first orifice O1, the injector means include a third orifice O3 passing through the outer casing CE and positioned substantially between the first orifice O1 and the leading edge BA of the vane A1. In addition, in the embodiment shown, the injector means also include an orifice Oy passing through the outer casing CE and positioned substantially between the third orifice O3 and the leading edge BA of the vane A1. The jet of air JT is then injected into the passage VN via the first orifice O1, the third orifice O3, and the other orifice Oy, thereby enabling a more extensive zone of the leading edge BA of the vane A1 to be subjected to anti-icing.

Furthermore, in the embodiment shown in FIGS. 1 to 9, the first orifice O1 for de-icing a vane A1 may be made in an outer platform of the vane or indeed in a splitter nose.

When the orifices are made in the outer platform of the vane, each vane A1 has an inner platform and an outer platform between which the vane A1 extends. In this embodiment, the inner platforms of the vanes in a given ring form an inner shroud, and the outer platforms of the vanes in a given ring form an outer shroud. In this embodiment, the outer casing CE includes said outer shroud of the vane A1, each outer shroud of each of the vanes A1 thus including first orifices O1 for de-icing the vane A1 and possibly also second de-icing orifices.

Figure 10:
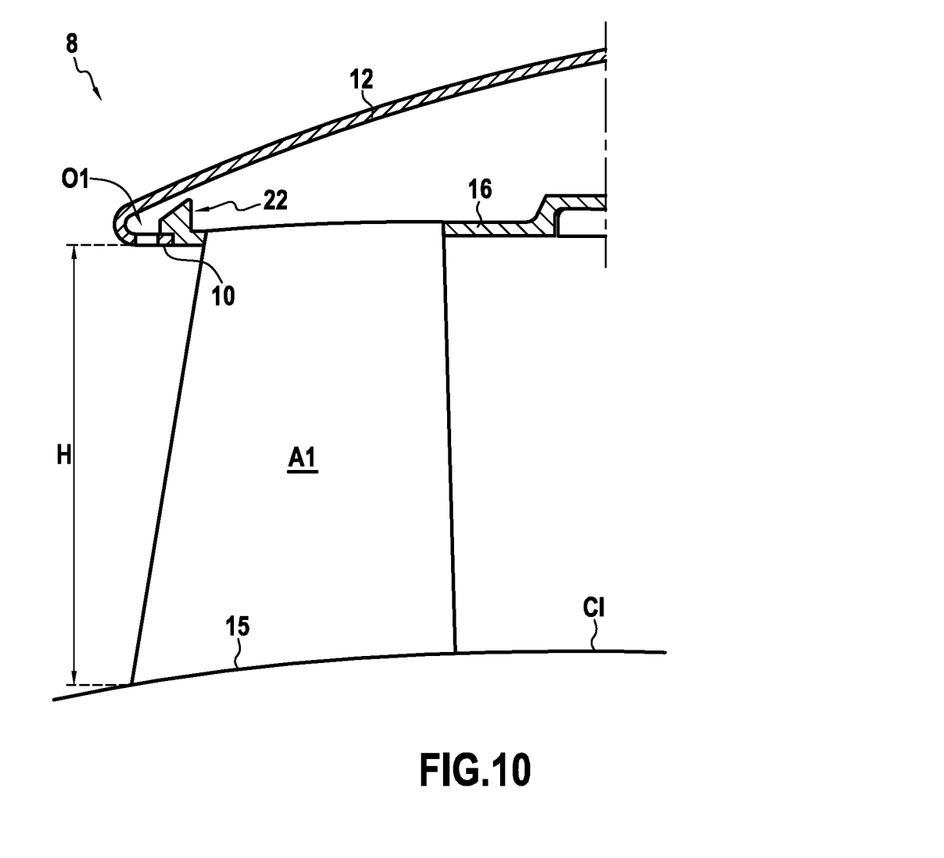
FIG. 10 shows a turbine engine flow passage in longitudinal section having placed thereacross a vane A1 and an anti-icing system in another embodiment of the invention that includes a splitter nose.

FIG. 10 shows a fifth embodiment of the injector means, in which the outer casing CE includes a stream splitter nose 8 for positioning downstream from a fan of the engine in order to split a primary stream and a secondary stream coming from the fan between annular flow channels. The nose 8 is positioned upstream from the ring having the vanes A1 for de-icing. The ring has an inner shroud 15 and an outer shroud 16 between the vane A1 extends, the inner and outer shrouds 15 and 16 forming respectively an inner platform and an outer platform of the vane A1, and the inner and outer shrouds 15 and 16 being contained respectively in the inner and outer casings CI and CE. The vanes A1 are sloping vanes, the junction between the vane A1 and the inner shroud 15 of the ring being positioned further upstream than the junction between the vane A1 and the outer shroud 16 of the ring. The splitter nose 8 has an outer annular wall 12 defining the inside of the flow channel for the secondary stream, and an inner annular wall 10 defining an inlet to the flow channel for the primary stream. The outer shroud 16 of the ring is mounted and held stationary at its upstream end on the inner annular wall 10 of the splitter nose 8 by a hook 22 integrated in said outer shroud 16, and downstream it is mounted and held on a structural casing (not shown) of the engine. In this fifth embodiment, the inner wall 10 of the splitter nose 8 has the first de-icing orifice O1 for each vane A1 and the second de-icing orifices, if any. The axis of each orifice O1 in this example is substantially radial relative to the axis of revolution around which the ring comprising the vanes A1 is mounted. Each first orifice O1 is thus separated by a distance H from the inner shroud 15 of the ring, i.e. from the inner casing CI, that defines the flow passage for the primary stream on the inside (the distance H also corresponds to the height of the passage in register with the injection orifices O1).

It should be observed that it is naturally possible to combine the second or the third embodiment with the fourth embodiment, and that the number of orifices may vary as a function of requirements.

Figure 9:
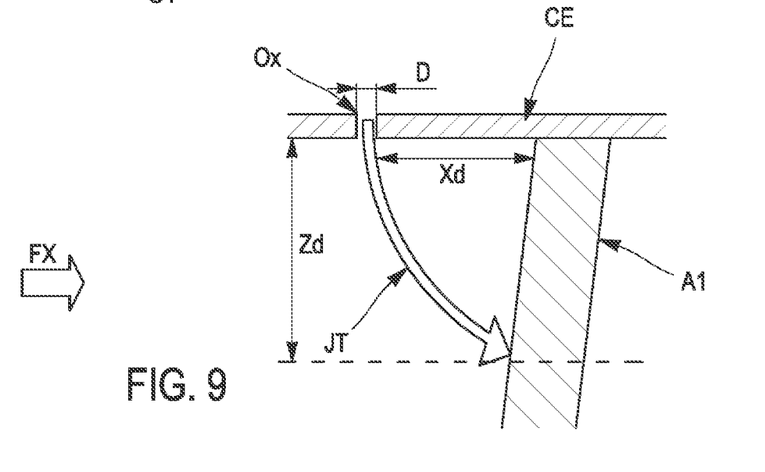
FIG. 9 is a more accurate view of the portion comprising a first or second orifice Ox and the junction between the vane A1 and the outer casing CE.

Furthermore, in the embodiments described, the orifices extend radially through the outer casing CE relative to the longitudinal axis X. In other words, the axes along which the orifices extend and the longitudinal axis are orthogonal. An orientation at 90° serves to maximize the penetration of the jet of air JT into the passage VN, thus making it possible to impact the leading edge BA of the vane A1 at a penetration distance Zd from the outer casing CE that is maximized, as shown in FIG. 9. In other embodiments, these axes are not orthogonal: the orifices then slope relative to a radial axis, thereby reducing the penetration distance Zd. It should be observed that it is naturally possible to cause some of the orifices to slope in manners that are different from other orifices, as a function of having different desired points of impact.

Furthermore, in the embodiments where the first orifice O1 is made in the outer casing CE, the first orifice O1 is positioned upstream from the leading edge BA1 of the vane A1 in a first direction D1 at a distance of not less than 10 mm and preferably about 15 mm from the leading edge BA1, and more precisely from the junction between the leading edge BA1 and the outer casing. Thus, when the vane A1 is a sloping vane, the first orifice O1 is positioned in register with a point of the leading edge BA1 that is situated at a height of about 40% of the passage VN.

Since the anti-icing system could be made to de-ice all of the vanes in a turbine ring, there may be a respective first orifice for each vane in the ring, the first injection orifices being distributed around the circumference of the annular wall of the outer casing. The first orifices may be circular or oval. In any event, they may present a hydraulic diameter D that satisfies the inequality 0.02≤D/H≤0.6, where H corresponds to the height of the passage VN, as shown in FIG. 10. In known manner, the hydraulic diameter is defined for air as the ratio between four times the area of the flow section through an orifice over the perimeter of the orifice. For an injection orifice of circular section, the hydraulic diameter is equal to the diameter of the orifice.

Furthermore, the dimensions of the orifices have an influence on the flow rate of the jet of air JT that is injected into the passage VN. Thus, by adjusting the dimensions of the orifices, their angles of inclination, and their distances Xd away from the vane A1 (see FIG. 9), it is possible to impact against the leading edge BA of the vane A1 in targeted zones. It should be observed that the greater the dimensions of the orifices, the greater the quantity of air that is taken, and thus the greater the cost in terms of engine performance. Given this constraint and the small amount of space available upstream from the vane A1, it is advantageous to use circular orifices having a diameter D of less than 15 mm, and more particularly lying in the range 0.5 mm to 5 mm.

For a radially oriented circular orifice, the equations given below (Holdeman equations) explain the correlation between the penetration distance Zd, the diameter D of the orifice, and its distance Xd away from the vane A1:

$$\frac{Zd}{D} = 0.76 \frac{\rho^{0.71}}{\rho_\infty} J^{0.52} \frac{Xd^{0.27}}{D}$$

$$J = \frac{\rho V^2}{\rho_\infty V_\infty^2}$$

where:
J is the blow-up ratio of the jet of air JT;
$\rho$ is the density of the air in the jet JT at the injection orifice;
$\rho_\infty$ is the density of the air in the passage VN upstream from the vane;
V is the velocity of the air in the jet JT at the injection orifice; and
$V_\infty$ is the velocity of the air in the passage VN upstream from the vane.

Advantageously; the ratio $$\frac{Zd}{D}$$

is selected to lie in the range 1 to 200 for anti-icing applied to a turbine engine vane. More particularly, a ratio $$\frac{Zd}{D}$$

in the range 5 to 10 provides a good compromise between the temperature of the jet on impact, and the various constraints associated with integrating the solution: position, orifice diameter, and limited injection flow rate. Advantageously, the blow-up ratio J is selected to be greater than 10, thus enabling a jet to be obtained that is strongly separated from the casing. Specifically it is desired to optimize penetration of the jet into the passage in order to obtain a system that is effective with a limited flow rate, and consequently with an impact of lesser performance.

Naturally, the orifices need not be circular in section: for example they may be rectangular or oblong in section. It should be observed that it is also possible that the orifices are not all of the same shape, depending on the characteristics desired for the impact.

Finally, in order to optimize anti-icing over as large a height of the vane as possible, it is necessary to control the temperature drop of the jet of air JT. A temperature T of the jet on impact of the order of several tens of degrees (e.g. in the range 40° C. to 300° C.) is essential in order to provide a de-icing function. The temperature T of the jet on impact is expressed by the following equation:

$$T = \left[1.85 \frac{\rho^{0.71}}{\rho_\infty} J^{-0.43} \frac{Xd^{0.27}}{D}\right](T - T_\infty) + T_\infty$$

where $T_\infty$ is the temperature of the jet of air JT at the injection orifice.

The invention claimed is:

1. An anti-icing system for a turbine engine vane extending between an outer casing and an inner casing defining a passage, the system comprising:
   injector means for injecting a jet of air into the passage upstream from the vane, the injector means including a first injection orifice for injecting the jet of air, the first orifice passing through one member selected from the outer casing and the inner casing, and being located in such a manner that, at a first speed of the engine in which a stream of air flows generally in the passage along a first direction, the first orifice and a leading edge of the vane are substantially in alignment along the first direction,
   wherein the first orifice is spaced apart from a junction between said leading edge of the vane and the member through which the first orifice passes by a distance of at least 10 mm, and
   wherein the leading edge is a sloping leading edge and the first orifice is positioned in register with a point of the leading edge situated at a height of about 40% of said passage from a radially inner end of the vane.

2. The anti-icing system according to claim 1, wherein the first orifice extends substantially radially relative to a longitudinal axis along which the turbine engine extends.

3. The anti-icing system according to claim 1, wherein the injector means include a second injection orifice for injecting a second jet of air, the second orifice passing through the member and being located in such a manner that at a second speed of the engine, different from the first speed, wherein the stream of air flows generally in the passage along a second direction, different from the first direction, the second orifice and the leading edge of the vane are substantially in alignment along the second direction.

4. The anti-icing system according to claim 3, further comprising shutter means for shutting the first orifice or the second orifice and controlled as a function of the speed of the engine.

5. The anti-icing system according to claim 1, wherein the injector means include a slot passing through the member and shutter means for partially shutting the slot, the first orifice being constituted by the portion of the slot that is not shut.

6. The anti-icing system according to claim 1, wherein the injector means include a third injection orifice passing through the member, and positioned substantially between the first orifice and the leading edge.

7. The anti-icing system according to claim 1, further comprising means for taking the jet of air from a compressor of the engine and wherein said anti-icing system has a blow-up ratio greater than 10.

8. The anti-icing system according to claim 1, further comprising a plurality of vanes,
   wherein each vane of the plurality of vanes has an inner platform and an outer platform between which each vane extends, the inner platforms of the plurality of vanes in a given ring forming an inner shroud, the outer platforms of the plurality of vanes in the given ring forming an outer shroud, the outer casing including said outer shroud, the outer platform of each vane of the plurality of vanes including the first orifice for de-icing the vane.

9. The anti-icing system according to claim 1, wherein the outer casing includes a stream splitter nose for positioning downstream from a fan of the engine in order to separate a primary stream and a secondary stream coming from the fan between annular channels, said nose being positioned upstream from the vane and having an outer annular wall defining the inside of the flow channel for the secondary stream and an inner annular wall defining an inlet to the flow channel for the primary stream, said inner wall including at least said first orifice.

* * * * *

UNITED STATES PATENT AND TRADEMARK OFFICE
CERTIFICATE OF CORRECTION

Page 1 of 1

PATENT NO. : 10,683,805 B2
APPLICATION NO. : 15/748252
DATED : June 16, 2020
INVENTOR(S) : Guillaume Claude Georges Philippe Linassier et al.

It is certified that error appears in the above-identified patent and that said Letters Patent is hereby corrected as shown below:

On the Title Page

Item (72), the sixth inventor's name is incorrect. Item (72) should read:
--(72) Inventors: Guillaume Claude Georges Philippe Linassier, Moissy-Cramayel (FR); Morgan Balland, Moissy-Cramayel (FR); Helene Mazet, Moissy-Cramayel (FR); Christophe Scholtes, Moissy-Cramayel (FR); Antoine Robert Alain Brunet, Moissy-Cramayel (FR); Simon Amoedo, Moissy-Cramayel (FR)--

Signed and Sealed this
Eleventh Day of August, 2020

Andrei Iancu
*Director of the United States Patent and Trademark Office*